May 10, 1932.　　　C. P. DUBBS　　　1,857,532
APPARATUS FOR TREATING HYDROCARBONS AND THE LIKE
Original Filed Oct. 16, 1920
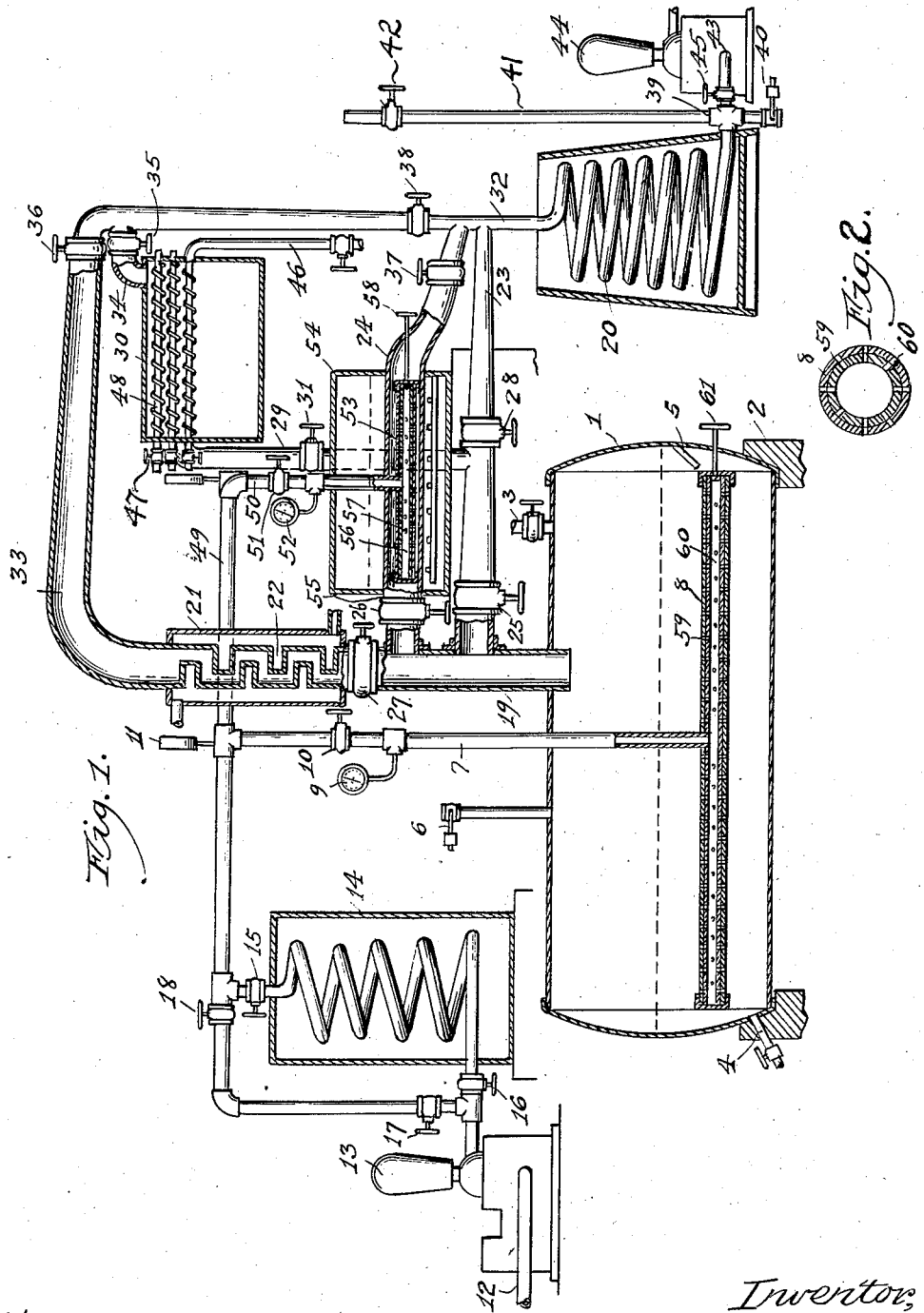

Patented May 10, 1932

1,857,532

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR TREATING HYDROCARBONS AND THE LIKE

Original application filed November 18, 1914, Serial No. 872,698. Divided and this application filed October 16, 1920. Serial No. 417,310. Renewed August 13, 1930.

This application is a divisional of an original application filed by me, November 18, 1914, Serial No. 872,698.

My invention relates to an apparatus for treating hydrocarbons, such as petroleum and the residue therefrom, though in its broader aspects the invention is not limited to the treatment of any particular substance or substances.

Among the salient objects of the invention are to provide an apparatus in which the air, steam, natural gas or other substance injected, has a relatively high velocity at the point of its discharge into the substance treated; to provide an apparatus for utilizing this high velocity, while keeping the quantity injected sufficiently low for practical purposes; to employ a plurality of comparatively small streams under relatively high pressure, the size of the openings and the number being proportioned to the work to be done and the velocity of discharge desired; to provide an apparatus for adjustably regulating the size of the openings through which the injected substance is discharged into that treated, whereby a lesser quantity of the substance may be injected without decreasing the velocity at the time of its discharge, or the velocity increased while maintaining the same quantity; to provide an apparatus for affixing or adding a larger percentage of oxygen to the products; to utilize the high velocity with which the liquid or gases are injected into the substance treated, to produce a more complete union, mechanical, chemical, or both, between portions of the substance treated and that injected; to provide an apparatus for treating the substances by forcing into them at high velocity both steam and air or other combinations of vapors, gases and the like; to employ the velocity of admission of the substance injected as a means for governing the temperature at which the fractional distillation of the hydrocarbon or hydrocarbons treated are distilled off; to provide an improved apparatus whereby the hydrocarbons treated can be subjected to pressures ranging from relatively low to excessively high without danger of explosion; to provide an apparatus whereby the temperatures at which fractional distillation is conducted may be controlled within a wide range, and the boiling points changed, also the combining of the substances to a greater or less extent and subjecting the same to any desired temperature and pressure to obtain the reaction desired; to provide an improved apparatus for the production of high grade refined oils, especially the lubricants and like, and the production of heavy liquid residums and asphalts, said asphalts ranging from a semi-solid at ordinary temperatures, to asphalts of a hard and brittle nature such as mineral rubber and the like; to provide an apparatus for commercially producing higher quality lubricants and asphalts from either paraffine base oils or the so-called asphaltic base oils; to provide an apparatus whereby the hydrocarbons or other substances treated may be subjected to any desired pressure action without the necessity of keeping the substance treated under a like pressure; and in general to provide a new and improved apparatus for treating hydrocarbon oils and the like.

In the accompanying drawings which illustrate, somewhat diagrammatically, my apparatus:

Fig. 1 is a diagrammatic side elevation of the apparatus, partly in section.

Fig. 2 is a cross section showing the control of the perforated pipe 8.

Referring in detail to the drawings and describing first the use of the apparatus in making asphalt, 1 designates the still supported directly over the furnace lugs 2, although various other means for heating the still might be employed. At the upper end, the still is provided with a filling connection 3, and near the bottom with a drawoff cock 4. There is preferably also provided a pyrometer well 5 and a weighted safety valve 6, all of these parts being of standard construction. Extending downward into the still is an air or steam pipe 7 connected at its lower end with a horizontally extending perforated pipe 8. The pipe 7 is provided with a suitable pressure gauge 9 and a cut-off valve 10, while extending into the tube from its upper end is a pyrometer 11. This pipe 7 is connected to a supply pipe 12 leading from a suitable source of supply of steam, air or other substance which it is desired shall be injected into the contents of the still 1 through the perforated pipe 8. In certain instances, it may be desirable to increase the pressure under which the substance is forced out of the perforated pipe 8 to a greater pressure than that under which the source of supply is maintained, and for this purpose a pump 13 is employed, although if desired, the pipes 12 and 7 may be connected by a by-pass (not shown) around the pump 13. In order to provide for raising the temperature of the substance injected into the still contents, a superheater 14 is employed in the connection between the supply pipe 12 and the pipe 7, although the superheater can be cut out of the circuit by closing the valves 15 and 16 and opening the by-pass valves 17 and 18. From the above description it is obvious that the substance ejected from the pipe 8 into the contents of the still may be forced into the pipe 8 at any desired pressure or temperature.

Leading from the top of the still is a gooseneck 19 which connects with the condenser 20 in a plurality of ways hereinafter described in detail:

Positioned in the upright of the gooseneck 19 is a reflux condenser 21, this condenser comprising a plurality of water baffles 22 around which circulate a water or other temperature controlling medium. Leading from the upright of the gooseneck 19 at a level below that in which the reflux condenser 21 is located, are laterals 23 and 24, entrance from the gooseneck 19 to these laterals being controlled by valves 25 and 26, and the entrance from the gooseneck 19 to the reflux condenser being controlled by similar valve 27. In addition to the valve 25, the lateral 23 is provided with a second cutoff valve 28 positioned just beyond the upright 29 which connects the lateral 23 with an air condenser 30. Communication between this air condenser and the lateral 23 is controlled by cut-off valve 31. Each of the laterals 23 and 24 connect with an upright line 32, and the air condenser 30 and reflux condenser 21 are also connected to this line by vapor pipes 33 and 34, the latter having a valve 35 and the former a similar valve 36. Additional valves 37 and 38 are provided in the lateral 24 and vapor line 32.

The condenser 20 at its discharge end is provided with a coupling 39 from the lower end of which is a discharge opening controlled by a weighted valve 40. Leading from the upper end of the cross coupling 39 is an escape pipe 41 controlled by suitable valve 42. In addition, to these connections the coupling 39 has a lateral pipe 43 connected with a vacuum pump 44. A valve 45 is employed for cutting off the pump, and both the pump and weighted valve control outlet lead to a suitable storage tank or other receptacle (not shown).

In treating liquids which give a distillate having boiling points higher than the boiling point of water, the vapors are, by adjusting the valves 28 and 31, forced to pass through the air condenser 30 against baffle plate tubes 48 which condense such distillates as have boiling points higher than that of water. These condensed distillates are collected in the bottom of the air condenser and overflow through pipe 46 to suitable storage, the air condenser being maintained at a temperature above the boiling point of water by opening or closing the air valves 47 on the baffle plate tubes 48. The uncondensed oils and steam pass through pipe 34 into vapor line 32 and into condenser 20.

In certain instances, it is desirable that the vapors be subjected to the high velocity of an injected substance in addition to or substitution of the treatment in the still. For this purpose the supply pipe 12 and extension 49 are connected to a second upright 50, the latter being provided with a control valve 51 and pressure gauge 52. At its lower end the upright 50 discharges into a perforated pipe 53 similar to the perforated pipe 8 employed in the still. The perforated pipe 53 is located in the lateral 24, and the latter is surrounded by a furnace 54, whereby its temperature may be raised if desired. The temperature of the vapors at the time they pass into the lateral 24 is determined by a pyrometer which can be placed at the point marked 55, while the size of the openings 56 in the perforated pipe 53 is controlled by means of a rotary sleeve valve 57 which is operated by an exterior stem 58. In a similar manner the discharge through the openings 59 in the pipe 8 is controlled by a valve 60 operated by a stem 61. The purpose of this valve is to permit the total cross-sectional area of the discharge openings being increased or diminished to regulate the volume of the injected substance without changing the pressure at which it is supplied; or, if desired, the volume discharged through the openings 59 or 56 can be maintained constant while increasing the velocity with which the injected substance is discharged into the substance treated.

It is obvious from the above description of the apparatus that it is adapted for treating a wide range of substances for producing various products depending upon temperatures and the velocity and temperature which one or more substances is injected into others. However, in all instances the substance treated is subjected to the action of another substance which is forced into the substance treated at such a velocity as will produce the desired results.

By employing my invention I have secured very high quality lubricants, and such oils are obtained from the different petroleums, and asphalts of very high quality obtained from paraffin base oils, which hitherto could not be done. Also, I have produced asphalts of a much higher quality from the so-called asphaltic base oils. By varying the pressure under which the saturated and superheated steam, or like acting gas, was ejected from the perforated holes of the pipe 8 submerged in the oils treated, and using various temperatures at which the petroleum was heated, I have succeeded in producing a very high quality of asphalt ranging from a semi-solid at ordinary temperature to a hard and brittle asphalt like mineral rubber from a paraffin base oil. Using the asphalt base oils, I find that my method will produce lubricants and the like, of very much higher quality than those heretofore produced, and asphalts of very hard grades free from the deteriorating compounds produced from destructive distillation as is the case in the former methods.

By taking a much smaller volume of superheated steam or other injected substance to treat the same quantity of oil or residuum but decreasing the size of the holes in the perforated pipes so that the substance was ejected from the perforated pipes into the oil or residuum at the proper pressure, it was found that in refining oils for their fractional distillates and asphalts, it is commercially feasible to distill them at a very much lower temperature, and the lubricants distilled off were much higher in quality and a very high grade of asphalt is produced.

In refining oils and making residuum or asphalts or treating residuums, the method of operation is as follows:

The still is charged with the proper quantity of the substance to be treated. If steam is to be used, either saturated or superheated, it is injected into the charge in the still at a relatively high velocity, the charge in the still being maintained at the proper temperatures by means of a fire in a furnace under the still. The valves 27, 26 and 28 are closed and the valves 25, 31, 35 and 38 are opened. The vapors will be compelled to pass through the air cooled condenser before being discharged into the main condenser 20, the air cooler condensing the distillates having boiling points higher than water, thus preventing such distillates from emulsifying with the water. The temperature of the air cooled condenser 30 is maintained above the boiling point of water.

If however, the charge in the still 1 is subjected to treatment by a substance that will not emulsify with the distillates on cooling, the path of the vapors may be direct through the lateral 23 into the main condenser 20. To aid in getting the distillates off or recovering the substance injected, the vacuum pump 44 may be employed. In this treatment the contents of the still 1 can be subjected to the maximum pressure during the entire operation; the quantity of the injected gas, can if wanted, be varied by adjusting the size or number of discharge openings in the perforated pipe 8, or if desired a comparatively low pressure may be employed at the start and gradually increased until a relatively high rate of discharge from the openings 59 is obtained. The pressure may range from a comparatively few pounds to a pressure in excess of 2000 pounds per square inch above the pressure the charge in the still is maintained under. The pressure and temperature can be proportioned to best suit the nature of the substance treated and products desired.

In treating oils, asphalts or other substances for the purpose of affixing or adding oxygen thereto, the contents of the still are maintained at a temperature below their flashing point and a substance containing oxygen which is either steam or air is injected into the contents of the still from the perforated pipe 8 at a temperature below the flashing point of the substance treated and at a relatively high velocity. The employment of this high local velocity of discharge of the substance injected into the still contents, results in affixing or adding a larger percentage of oxygen than was commercially possible in other methods. The pressure employed depends upon the substance treated and percent of oxygen added, the pressure ranging from a few pounds to over 2000 pounds per square inch, and if desired a vacuum pump 44 may be employed. The foregoing pressures can be maintained throughout the entire apparatus or, if desired, the distilling pressure may be higher than the condensing pressure, or in other words, a differential pressure maintained.

In converting the higher boiling point oils to lower boiling point oils, such as in making gasoline from high boiling point residuums or distillates, the valves 25 and 26 are closed, and the valve 27 opened. The vapors then in passing to the condenser 20 are compelled to pass through the reflux condenser 21, the temperature at which this condenser is maintained being such as to condense and return to the still those vapors that do not have a low enough boiling point.

In all these cases the controlling factor is the velocity of discharge of the injected substance and the temperature of the substance treated. It is to be noticed that the method is such that it may be carried out as a continuous process, and while I have shown and described a particular apparatus and described the treatment of certain substances, it is obvious that the invention is not limited to the particular apparatus, products or treatmen of substances enumerated, and I do not desire to limit the invention except as specified in the following claims.

I claim as my invention:

1. In an apparatus adapted for the distillation of petroleum oil under pressure, the combination with a still, of means for heating the contents of the still by means of a heated gas injected into the body of oil in the still, a second heating chamber, connections between the vapor space of the still, and said second heating chamber, means for heating said second chamber, a water condenser, connections between said second heating chamber and said water condenser, a throttle valve interposed in said connections, a throttle valve for regulating the flow of oil from the outlet side of said water condenser, and means whereby the vapors which pass out of the still may be bypassed past the second heating chamber.

2. In an apparatus for cracking petroleum oil, the combination with a still, means for heating a body of oil in the still, a plurality of fractional condensers, connections between said still and said fractional condensers whereby either fractional condenser may be placed in communication with the still and reflux condensate returned to the still from one of said condensers, means for withdrawing condensate from the other condenser, a final condenser in communication with both of said fractional condensers and means for maintaining a superatmospheric pressure on the oil in said still.

3. In an apparatus for cracking petroleum oil, the combination with a still, means for heating a body of oil in the still, a plurality of fractional condensers, connections between said still and said fractional condensers whereby either fractional condenser may be placed in communication with the still and reflux condensate returned from one of said fractional condensers to the still, means for discharging from the apparatus without further treatment condensate from the other fractional condenser, a final condenser in communication with both of said fractional condensers and means for maintaining a superatmospheric pressure on the oil in said still and on the vapors passing through either fractional condenser.

CARBON P. DUBBS.